Dec. 25, 1962   D. P. HINES   3,069,909
TEMPERATURE REFERENCE BLOCK
Filed May 11, 1959

INVENTOR.
DOUGLAS P. HINES.
BY
Howard M. Dunton

United States Patent Office 3,069,909
Patented Dec. 25, 1962

3,069,909
TEMPERATURE REFERENCE BLOCK
Douglas P. Hines, San Jose, Calif., assignor to General Electric Company, a corporation of New York
Filed May 11, 1959, Ser. No. 812,494
6 Claims. (Cl. 73—361)

This invention relates to a temperature reference block for thermocouple circuits and more particularly to a temperature reference block for reference thermocouples.

In an experimental or industrial process it is often necessary to measure many different temperatures with thermocouple circuits. To determine the temperature at measuring thermocouples, the temperature at corresponding reference thermocouples must either be ascertained or be maintained at a known constant temperature; otherwise, only the temperature differences between the measuring thermocouples and the corresponding reference thermocouples may be determined.

It has been the practice to maintain the reference thermocouples at a known constant temperature by placing them in an ice water bath. That practice is satisfactory under laboratory conditions, but not under industrial conditions. The practice in industry has generally been to provide a thermostatically controlled compartment for the reference thermocouples. However, if the temperature of the compartment must be controlled to within a fraction of a degree, a sufficiently good and reliable regulating means for that compartment may be too expensive, complex or delicate for industrial use.

To satisfy the needs of industry it is more convenient to allow the temperature of the reference thermocouples to float or change with the ambient temperature of the environment. Then it is only necessary to ascertain the temperature at the reference thermocouples. If the reference thermocouples are thermally connected together so that they are all at substantially the same temperature it is only necessary to ascertain one reference temperature, namely the temperature of the medium thermally connecting the reference thermocouples.

An obvious way to thermally connect all the reference thermocouples is to embed them in a body of good thermal conducting material such as copper, magnesium or aluminum. Since each thermocouple circuit must be a separate and independent electrical circuit, it is necessary to have electrical insulation between the reference thermocouples and the thermal conducting body if the latter is a good electrical conductor. For example, it is frequently necessary to use many measuring thermocouples directly connected to parts of an object being tested that is itself an electrical conductor. When that is done, a common or reference potential is established for all of the measuring thermocouples. Under those circumstances, the reference thermocouples must be electrically insulated so that the electromotive force (E.M.F.) in each thermocouple circuit will accurately represent the corresponding temperature difference.

Unfortunately, good thermal conductors which could be used to thermally connect the reference thermocouples, such as copper, magnesium or aluminum, are also good electrical conductors. Conversely, good electrical insulators which could be used, such as silicone or resin, are not good thermal conductors. Although all substances possess the properties of electric and thermal conductivity in some degree, what is needed is a good thermal conducting substance which exhibits substantially no electrical conduction for an E.M.F. of less than one volt.

Metallic oxides are relatively good thermal conductors but not good electrical conductors. For example, when aluminum is oxidized, thermal conductivity is decreased by only a factor of about 75 whereas, electrical conductivity is decreased by a factor of about $0.5 \times 10^{20}$. Thus, it can be seen that an anodic oxide film is not only a good electrical insulator but also a good thermal conductor. Moreover, a very thin film about .0025 inch thick provides sufficient electrical insulation to prevent substantially all electrical conduction for an E.M.F. of less than one volt. Such a thin film, however, does not appreciably impede thermal conduction.

There are several commercial anodizing processes for obtaining anodic oxide films. If pure aluminum is used in an anodizing process, the anodic film produced is pure aluminum oxide, but if an aluminum alloy is used, the anodic film is substantially aluminum oxide mixed with impurities in quantities that depend on the nature and quantity of each constituent. Therefore, the exact amount of electrical conductance for an anodic oxide film depends upon the nature and quantity of impurities mixed in the film. However, there is at least one commercial process which removes a substantial amount of the impurities.

An aluminum oxide film is anodically produced by penetration into aluminum and not by plating, although there is a substantial dimensional build-up probably due to the oxide molecules having greater mass. In general, oxygen penetrates deeper into the aluminum to a depth partially determined by the length of time the anodizing process is allowed to continue. The penetrating oxygen combines with the aluminum to form an aluminum oxide film. Such a film may be obtained in a thickness in excess of .004 inch and under certain conditions as thick as .012 inch.

Anodic oxide films are, however, porous so that moisture may be absorbed through the pores, thereby increasing electrical conductivity through the film. Consequently, if the film is to be used as an electrical insulator, the pores must be sealed or the film must be encased for adequate protection against entry of moisture. Otherwise, the desired low electrical conductivity characteristic may be lost in a humid atmosphere.

Since the anodizing process is not a part of the present invention, it will not be described further, particularly as there is adequate literature published on that subject. A brief description of the process has been given only for the purpose of emphasizing the nature of anodic oxide films which, in combination with other elements, form the temperature reference block for reference thermocouples of the present invention.

The concept of this invention is to thermally connect reference thermocouples to a thermal conducting metallic body or block such that all of the reference thermocouples are at substantially the same temperature as the block which is allowed to float or change with the ambient temperature of its environment. Anodic oxide films of the metal in the block provide the necessary electrical insulation between the reference thermocouples and the block without appreciably affecting the desired high thermal conductance.

A thermometer is provided to ascertain the temperature of the block and the reference thermocouples. When these reference thermocouples are connected to corresponding measuring thermocouples in a system of thermocouple circuits, the temperature at the measuring thermocouples may be determined in a facile manner by adding the temperature of the block, which is substantially the same as the reference thermocouples, to the temperature difference between the reference thermocouples and the corresponding measuring thermocouples.

Accordingly, it is a primary object of this invention to provide a temperature reference block having high thermal conductivity in thermal contact with, but electrically insulated from, a plurality of thermocouples whereby all reference thermocouples are at a temperature close to that of the reference block under constant or varying temperature environmental conditions.

A further object is to provide a metallic oxide film between a block of thermal and electrical conducting material and a plurality of thermocouples to provide a path of high thermal conductance and low electrical conductance between the block and the thermocouples.

Another object is to provide a thermometer for determining the temperature of a temperature reference block whereby the temperatures at the measuring thermocouples may be obtained by adding the temperature of the temperature reference block to temperatures measured between the temperature reference thermocouples embedded in the block and corresponding measuring thermocouples.

These and other objects of my invention may be realized by providing a block of aluminum or similar material to thermally connect together all of the reference thermocouples of a plurality of thermocouple circuits and a thermometer for determining the temperature of the block. The reference thermocouples are separated from the block by thin films of aluminum oxide which provide a path of very high thermal conductance and very low electrical conductance between the reference thermocouples and the temperature reference block.

Other objects and advantages will become apparent on reference to the following specification when read in conjunction with the accompanying drawing in which.

Two dissimilar metals or wires joined or connected to each other at one end constitute a thermocouple which generates an E.M.F. that is approximately directly proportional to its temperature. That E.M.F., which is a measure of the temperature at the thermocouple or junction between the dissimilar metals, is quite small so that a sensitive potentiometer is required to measure it.

Figure 1:
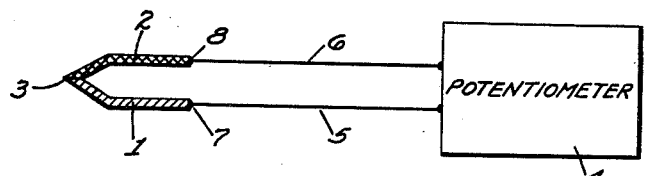
FIG. 1 illustrates a typical thermocouple circuit.

FIG. 1 illustrates a typical thermocouple circuit which includes two dissimilar metals 1 and 2 joined to form a thermocouple 3, which will hereafter be referred to as the measuring thermocouple, and a potentiometer 4 connected by leads 5 and 6 to the free ends of the dissimilar metals. The potentiometer 4 would measure the E.M.F. generated by the measuring thermocouple 3 and provide a measure of its temperature if it were not for an additional thermocouple, or thermocouples, formed at points 7 and 8 by connecting the leads 5 and 6 to the free ends of the dissimilar metals.

For example, if the leads 5 and 6 are copper but neither of the dissimilar metals 1 and 2 is copper, then two additional thermocouples would be formed at points 7 and 8 by the connection of the leads 5 and 6 to the dissimilar metals 1 and 2. On the other hand, if the leads 5 and 6 are copper and one of the dissimilar metals, for example the metal 2, is also copper, only one additional thermocouple would be formed at point 7 by the connection of the lead 5 to the metal 1. These additional thermocouples, hereafter referred to as reference thermocouples, generate E.M.F.'s that are approximately directly proportional to their temperature. Therefore, in a typical thermocouple circuit it is necessary to know or ascertain the temperature of the reference thermocouples in order to determine the temperature at the measuring thermocouple.

A brief example will further clarify the function of a reference thermocouple in a thermocouple circuit. Assume that leads 5 and 6 are of the same metal as metal 2. Then there are two similar thermocouples 3 and 7 formed at the connection between the dissimilar metals in the circuit. Each thermocouple generates an E.M.F. that is approximately directly proportional to its temperature. Those E.M.F.'s are oppositely poled so that the potentiometer 4 measures only the difference between them. Thus, the potentiometer reading is only a measure of the temperature difference between the measuring thermocouple 3 and the reference thermocouple 7. To determine the temperature at the measuring thermocouple 3, the temperature at the reference thermocouple 7 must be known or ascertained and added to the temperature difference reading obtained from the potentiometer 4.

Any suitable thermometer may be used to determine the temperature of the reference thermocouple 7. To insure accuracy in determining that temperature, the thermometer should be connected to the reference thermocouple 7 in such a way as to insure that the thermocouple and the thermometer are at substantially the same temperature. A suitable way is to embed both of them in a temperature reference block in accordance with the concept of this invention.

Figure 2:
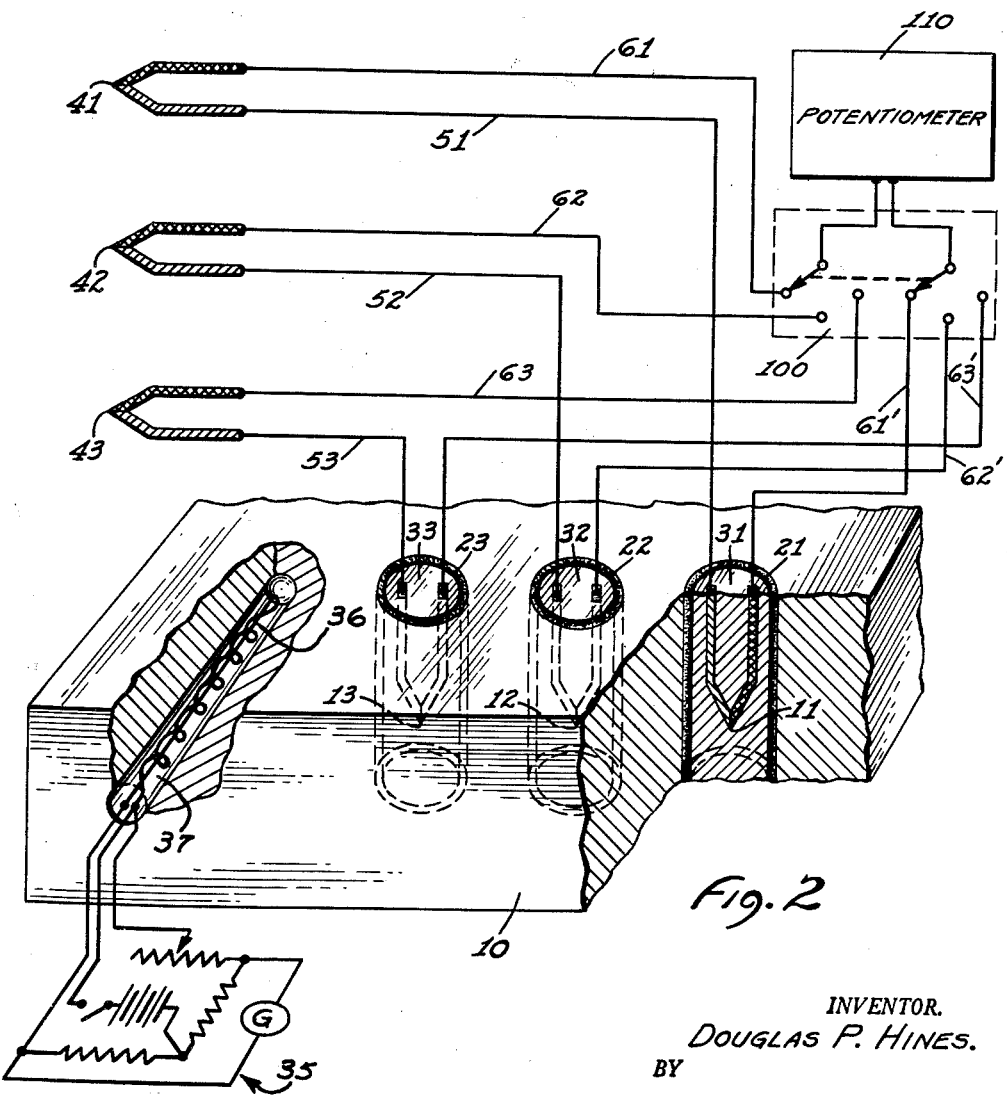
FIG. 2 illustrates a temperature reference block for a plurality of reference thermocouples in a system schematically shown to include three thermocouple circuits and a reference temperature sensing thermometer.

FIG. 2 illustrates one embodiment of a temperature reference block 10 for a plurality of reference thermocouples 11, 12, and 13. Although only three reference thermocouples are shown, there obviously may be as many as needed. The block 10 is made of aluminum to provide a good thermal connection between the reference thermocouples. A sectional view of the reference thermocouple 11 has been shown by cutting away a portion of the block 10, whereas, reference thermocouples 12 and 13 have been indicated only by dotted lines.

The function of the block 10 is to maintain all of the reference thermocouples 11, 12 and 13 at a temperature close to that of the block itself under constant or varying temperature environmental conditions. Since aluminum is a good thermal conductor, this function is accomplished by simply embedding all of the reference thermocouples 11, 12 and 13 in the block 10. However, because aluminum is also a good electrical conductor, the reference thermocouples must be electrically isolated from each other as explained hereinbefore. Annular films or rings 21, 22 and 23 of aluminum oxide are provided to electrically isolate the reference thermocouples from the block 10. Those films need to be only about .0025 inch thick.

The reference thermocouples 11, 12 and 13 are held in place within the rings 21, 22 and 23 by cores 31, 32 and 33 which may be made of any good thermal conducting material such as copper, magnesium or aluminum to provide a good thermal conducting path between the thermocouples and the rings.

These elements may be assembled by: (1) drilling a sufficient number of holes or cavities in an aluminum block; (2) anodizing the surfaces of the cavities to the desired thickness, either by anodizing the entire surface of the block or by masking the outside surface of the block and anodizing only the surfaces of the cavities; (3) embedding the reference thermocouples in cores of copper; and (4) pressing the cores into the cavities. Copper is preferred for the cores because it is malleable. The danger of cracking or chipping the films may be avoided by making the cores smaller than the cavities so that they may be easily placed in the cavities and then expanded radially until a good thermal connection is made with the films. The radial expansion is easily obtained with malleable copper by simply swaging the cores after they have been properly positioned in the cavities.

As pointed out hereinbefore, pores in the anodic oxide films 21, 22 and 23 absorb moisture. Therefore, to retain the low electrical conductivity characteristic of the films, it is necessary to seal the pores. That can be done before the cores 31, 32 and 33 are placed in the cavities by either hot dipping or vacuum impregnating the anodic films in the cavities with a suitable commercially available compound that repels moisture such as a wax or resin. Waxes and resins also absorb moisture to a slight degree, but the moisture absorbed by them is not sufficient to materially alter the very low electrical conductivity of the anodic oxide films. An alternative method for preserving the anodic oxide films in a dry state is to encase the entire reference block assembly in a moisture proof container, or by "potting" or wrapping it with moisture proof material.

To complete the assembly of a temperature reference block according to the concept of the present invention, it is only necessary to provide a suitable thermometer for determining the temperature of the block. Such a thermometer is illustrated as a standard electrical resistance thermometer 35 consisting of a three-lead Wheatstone-bridge having a wire coil 36 in one branch. The coil 36 is inserted into a hole 37 in the block 10. Calibrated temperature resistance coils are commercially available in protective tubes having appropriate electrical insulation. It is only necessary to insert the tube containing a coil into the hole 37 in such a manner as to provide a good thermal connection between the tube and the block.

Having described the structure of the present invention, the temperature reference block, the structure and operation of a typical thermocouple circuit system using it will now be described. Assume that measuring thermocouples 41, 42, and 43 are made of the same dissimilar metals, X and Y, as the reference thermocouples 11, 12 and 13; that the leads 51, 52 and 53 are made of metal X wire and connect the metal X of the reference thermocouples 11, 12 and 13 to the metal X of the measuring thermocouples 51, 52 and 53 as shown; that the metal Y in each measuring thermocouple 41, 42 and 43 is connected to the metal Y of a corresponding reference thermocouple 11, 12 or 13 by leads 61, 62 and 63, and leads 61', 62' and 63', respectively, through a switch 100 and a potentiometer 110; and finally, that the leads 61, 62, 63, 61', 62' and 63' as well as the switch 100 and the circuit through the potentiometer 110 are made of the metal Y. The metal Y may be copper so that an all-copper circuit may be maintained through the switch 100 and the potentiometer 110 while the metal X may be any other dissimilar metal such as constantan, a copper-nickel alloy.

The function of the switch 100 is to selectively connect the potentiometer between the leads 61, 62 and 63 and the leads 61', 62' and 63', respectively. The switch 100 is shown in the position which connects the potentiometer 110 between the leads 61 and 61' in order to read from the potentiometer 110 the E.M.F. or temperature difference between the measuring thermocouple 41 and the reference thermocouple 11. By moving the switch 110 to other positions, the temperature difference between the thermocouples 42 and 12 or the thermocouples 43 and 13 may be measured.

The measuring thermocouples 41, 42 and 43 shown may be used to measure the temperature of three different parts of a body or process being tested. To determine the temperature being measured by any one of the measuring thermocouples at any particular instant, the potentiometer 110 is first connected to the particular measuring thermocouple and its corresponding reference thermocouple by properly positioning the switch 100. Readings are then taken from the potentiometer 110 and the resistance thermometer 35.

The potentiometer 110 and the thermometer 35 may be calibrated so that a direct reading in degrees of temperature may be taken from each and added together to determine the temperature at the measuring thermocouple in degrees. Alternatively, apparatus may be provided for translating E.M.F. readings from the potentiometer 110 and the thermometer 35 into suitable digital or analog signals so that the addition may be made automatically by an electronic data processor.

Although the switch 100 has been schematically illustrated as of the mechanically operated contact switch type, it obviously could be of any other type known in the art such as of the electronic stepping switch type.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A temperature reference block comprising: a body of metallic material; an electrical current conducting element; and a thermal conducting film coupling said element to said metallic body, said film being an oxide of said metallic body and having an impedance to electrical conductance higher than said body of metallic material.

2. A temperature reference block comprising: a body of metallic material; a current conducting element; and an anodic oxide film on said metallic material thermally coupling said current conducting element to said metallic material.

3. A temperature reference block as described in claim 2 wherein said metallic material comprises aluminum.

4. A temperature reference block comprising: a body of thermal conducting metal having a plurality of cavities; an oxide film of said metal lining each of said cavities; a plurality of thermocouples, each being placed within one of said cavities; and a metallic core pressed into each of said cavities whereby a thermal coupling between each thermocouple and the oxide of its respective cavity is established.

5. A temperature reference block comprising: a body of thermal conducting metal having a plurality of cavities; an anodic oxide film of said metal lining each of said cavities; and a plurality of thermocouples, each being placed within one of said cavities; and a metallic core pressed into each of said cavities whereby a thermal coupling is established between each thermocouple and said body of metal by the core and the anodic oxide film of its respective cavity.

6. A temperature reference block as described in claim 5 wherein said metallic material is substantially aluminum and said anodic oxide film comprises substantially aluminum oxide.

References Cited in the file of this patent

UNITED STATES PATENTS

| 2,008,733 | Tosterud | July 23, 1935 |
| 2,475,238 | Hall | July 5, 1949 |
| 2,780,097 | McKinley | Feb. 5, 1957 |

FOREIGN PATENTS

| 499,016 | Great Britain | Jan. 17, 1939 |

OTHER REFERENCES

Chemical Engineer's Handbook, John H. Perry, Editor-in-Chief, 1st edition, 2nd impression, McGraw Hill Book Co. Inc., New York and London, 1934, p. 2349.